Patented Aug. 24, 1948

2,447,926

UNITED STATES PATENT OFFICE 2,447,926

ANTIKNOCK MOTOR FUEL

Sol B. Wiczer, Washington, D. C.

No Drawing. Application July 21, 1943,
Serial No. 495,649

2 Claims. (Cl. 44—69)

The present invention relates to anti-knock dope for addition to liquid motor fuels such as gasoline, and blends with other light combustibles.

It is known to add various mono lead alkyls and mixtures thereof to liquid motor fuels for Otto cycle internal combustion engines to prevent knocking. In a recent development it was found that such mixtures of lead alkyls where the alkyl is methyl and ethyl will give a range of boiling points to give more even distribution of lead compounds over the boiling point range of the motor fuel, thus giving more even distribution of anti-knock compound among the several cylinders of the engine with variable operating conditions, resulting in a higher road octane rating for the fuel doped therewith.

It is an object of the present invention to provide new anti-knock compounds of lead alkyls.

It is another object to provide new lead alkyls containing a higher proportion of lead in the compound.

It is a further object to provide a mixture of lead alkyls of more widely variable volatility in mixtures of methyl and ethyl lead alkyls while maintaining the superior anti-knock doping effect thereof.

Another object is to provide a variation in boiling range of the various materials particularly the scavenger halogenated compounds commonly mixed with the lead alkyls so that they also may be evenly distributed by providing a mixture of wide boiling point range.

In accordance with the present invention new lead alkyl compounds are provided wherein the lead concentration per molecule is increased. These new compounds may be removed, purified and used as anti-knock compounds per se, but inasmuch as their production is accomplished simultaneously with other lead alkyls as side reaction which improve their use as a mixture as well as the overall yield, the use of the resulting reaction products, a mixture is preferred.

The new compounds have the general formula:

(R)₃Pb—R'—Pb(R)₃ where R is alkyl preferably methyl or ethyl and R' is alkylene, preferably ethylene or methylene.

(CH₃)₃Pb—CH₂—Pb(CH₃)₃
(CH₃)₃Pb—CH₂CH₂—Pb(CH₃)₃
(C₂H₅)ₓ(CH₃)ᵧPb — CH₂CH₂—Pb(C₂H₅)ₓ(CH₃)ᵧ
(C₂H₅)ₓ(CH₃)ᵧPb—CH₂—Pb(C₂H₅)ₓ(CH₃)ᵧ
where x + y = 3
(C₂H₅)₃Pb—CH₂—Pb(C₂H₅)₃
(C₂H₅)₃Pb—CH₂CH₂—Pb(C₂H₅)₃ and by variation of alkyls between methyl and ethyl many other homologues are possible.

The compounds are prepared in several ways substantially according to the standard methods of preparing lead alkyls with the modification that one molecule of alkylene dihalide is reacted in the presence of a catalyst with two molecules either of trialkyl lead or its equivalent. Such equivalent may be (1) two molecules of tetra-alkyl lead, one molecule of hexa-alkyl di-lead, (2) capable of decomposing to two molecules of trialkyl lead, or (3) 6 molecules of alkyl halide and 2 molecules of lead in the form of an alloy with sodium (8–16% of sodium), likewise capable of forming two molecules of trialkyl lead. As stated above, the methyl and ethyl radicals are preferred as alkyls and methylene and ethylene radicals are preferred as the alkylene radicals. Chlorine and bromine are preferred as the halogen substituents. As to the catalyst, anhydrous aluminum chloride is preferred, but anhydrous ferric chloride, boron fluoride and active aluminum alloy. The last named catalyst is an active catalyst consisting of an alloy made from aluminum and small quantities of iron, copper, zinc and silicon.

*Example I*

534 grams of lead tetramethyl is placed in an autoclave together with 660 grams of ethylene dibromide and 6 grams of anhydrous aluminum chloride and heated for 3 hours at 80° C. After this period methyl bromide is removed by distillation and the residue filtered and used as anti-knock dope in motor fuel. It will consist of a solution of ethylene di-(lead tri-methyl) (CH₃)₃PbCH₂Pb(CH₃)₃, ethylene (lead tri-methyl) (lead di-methyl ethylene bromide)

(CH₃)₃PbCH₂CH₂Pb(CH₃)₂CH₂CH₂Br and similar side reaction products including some unreacted lead tetramethyl. If desired each of the individual anti-knock substances may be separated by fractionation, but direct addition as a mixture to motor fuel is preferred, the excess alkylene dibromide solvent serving as scavenger for lead residues in the engine. If desired the methyl bromide need only be partially removed or not at all to provide additional, more volatile scavenger, and other alkyl halides, such as methylene dibromide, propyl bromide, and propylene di-bromide, may be added to give volatile halogen compound over a similar boiling range as the anti-knock substance.

Example II 323 grams of lead tetraethyl, 267 grams of lead tetramethyl are mixed with 300 grams of ethylene dibromide, 300 grams of methylene dibromide and 5 grams of aluminum chloride and are heated in an autoclave for 2 hours at 88° C. The alkyl (methyl) and (ethyl) bromides are removed by distillation and the complex mixture of lead alkyls and alkylene di-lead alkyls dissolved in alkylene dibromides are filtered and used as antiknock dope for gasoline. It is pointed out that the scavenger solvent in this case will not only produce a wider mixture of alkylene dilead alkyls, but as scavenger will be more evenly distributed thru variable engine operating conditions. If desired the reaction product may be distilled in a vacuum or steam distilled and selected fractions may be used as anti-knock. As before, the more volatile methyl and ethyl bromides need not be removed, or only partially removed as desired, or additional alkyl halides may be added as in the previous example.

Example III 474 grams of dilead hexamethyl are mixed with 154 grams methylene dibromide and 4 grams of anhydrous aluminum chloride, and the mixture is dissolved in 200 grams of dry hexane. The solution is heated for 2 hours at 100° C. and the methylene di-(lead tri-methyl) isolated by steam distillation and used as an anti-knock.

Example IV 646 grams of lead tetraethyl is mixed with 154 grams of methylene dibromide, 400 grams hexane and 3 grams of anhydrous aluminum chloride and the mixture is heated at 90° C. for 3 hours in an autoclave. The lead anti-knock compound, a mixture of mono lead alkyls and methylene di-lead alkyls may be purified by distillation, or merely filtered and used directly as anti-knock blending agent.

Example V 534 grams of lead tetramethyl, is mixed with 154 grams of methylene dibromide 400 grams of hexane and 4 grams of aluminum chloride and the mixture is heated for 4 hours at 80° C. in an autoclave. The lead compounds are separated by distillation or used directly as anti-knock dope.

Example VI 304 grams of ethyl chloride, 120 grams of methyl chloride, 100 grams of 1,2 ethylene dichloride 2700 grams of lead sodium alloy containing 10% of sodium 5 grams of aluminum alloy containing 7% Cu, 1.5 zinc and 1% Fe are heated in an autoclave at 85° C. 2½ hours. The free alkyl halides are removed by distillation and the residue is vacuum distilled, to separate individual or mixtures of lead alkyls and ethylene di-lead alkyls.

Example VII 388 grams of ethyl chloride are mixed with 85 grams of methylene dichloride 2700 grams lead sodium alloy of 10% sodium content and 8 grams of active aluminum alloy as described in Example 6 and heated at 100° C. for 4 hours in an autoclave. At the end of this period, the ethyl chloride and methylene dichloride are separated from the lead compounds by distillation or if desired the lead compounds may be used directly as antiknick dope without purification other than filtration In actual use these compounds have superior road anti-knock value.

Moreover as pointed out by properly proportioning the scavenging agents over a wide boiling range the cylinders of the engine will remain cleaner.

It will be obvious that the dope may be added to various motor fuels such as, liquid hydrocarbon and blends thereof, with other combustibles for anti-knock doping thereof in various proportions.

Moreover the anti-knock hereof may be blended with other known doping agents to improve the effect thereof such as compounds which improve the susceptibility of the motor fuel to having its anti-knock improved by lead alkyls, stabilizers which prevent decomposition of leaded gasolines in storage by oxidation, top cylinder lubricants, and dyes, etc.

I claim:

1. A gasoline containing, in small but sufficient quantity to improve the anti-knock quality thereof, a compound of the formula

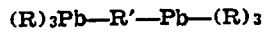

wherein R is an alkyl radical selected from the group consisting of methyl and ethyl and R' is an alkylene radical selected from the group consisting of methylene and ethylene.

2. A gasoline containing, in small but sufficient quantity to improve the anti-knock quality thereof, a compound of the formula

SOL B. WICZER.

REFERENCES CITED

The following references are of record in the file of this patent:

UNITED STATES PATENTS

| Number | Name | Date |
| --- | --- | --- |
| 1,949,949 | Alleman | Mar. 6, 1934 |
| 1,974,167 | Voorhees | Sept. 18, 1934 |
| 2,236,910 | Lincoln | Apr. 1, 1941 |
| 2,270,109 | Calingaert et al. | Jan. 13, 1942 |
| 2,364,921 | Shokal | Dec. 12, 1944 |

OTHER REFERENCES

Grüttner et al., Berichte der Deutschen Chemischen Gesellshaft, vol. 50, page 1557.

Emschurller, Comptes Residues, vol. 183 (1926), pages 665 667.